US006675226B1

(12) United States Patent
Nair et al.

(10) Patent No.: US 6,675,226 B1
(45) Date of Patent: Jan. 6, 2004

(54) NETWORK INTERFACE FOR INDUSTRIAL CONTROLLER PROVIDING APPLICATION PROGRAMMER INTERFACE

(75) Inventors: Suresh Nair, Twinsburg, OH (US); Michael J. Gilson, Goshen, IN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/193,783

(22) Filed: Nov. 17, 1998

(51) Int. Cl.[7] .............................................. G06F 15/16
(52) U.S. Cl. ...................................... 709/250; 709/249
(58) Field of Search ................................ 709/228, 327, 709/328, 249, 250; 710/10, 11

(56) References Cited

U.S. PATENT DOCUMENTS

| 5,550,984 | A | * | 8/1996 | Gelb |
| 5,572,724 | A | * | 11/1996 | Watanabe |
| 5,655,077 | A | * | 8/1997 | Jones et al. ............... 713/201 |
| 6,081,846 | A | * | 6/2000 | Hyder et al. ............... 709/250 |
| 6,118,768 | A | * | 9/2000 | Bhatia |
| 6,211,797 | B1 | * | 4/2001 | Kimura |
| 6,230,194 | B1 | * | 5/2001 | Frailong |
| 6,266,701 | B1 | * | 7/2001 | Sridhar |
| 6,324,582 | B1 | * | 11/2001 | Sridhar |

OTHER PUBLICATIONS

Jon Steel, "Micrsoft Windows NT Strategy Document and Installation Guide", Aug. 1996, p. 1–5, 28–29.*

* cited by examiner

*Primary Examiner*—John Follansbee
*Assistant Examiner*—Phuong N Hoang
(74) *Attorney, Agent, or Firm*—Quarles & Brady LLP; Alexander M. Gerasimow; William R. Walbrun

(57) ABSTRACT

A multi-port, multi-network interface allows desktop-type computers to be used in industrial control environments employing time critical network communications over multiple networks. A run-time program on the multi-network interface handles network protocol matters while interfacing two application programs through the mechanism of an API of the operating system of the desktop computer. The run-time program allows for different devices on different networks to be collected as a single logical entity through the use of a view attribute stored in a memory of the multi-network interface.

19 Claims, 3 Drawing Sheets

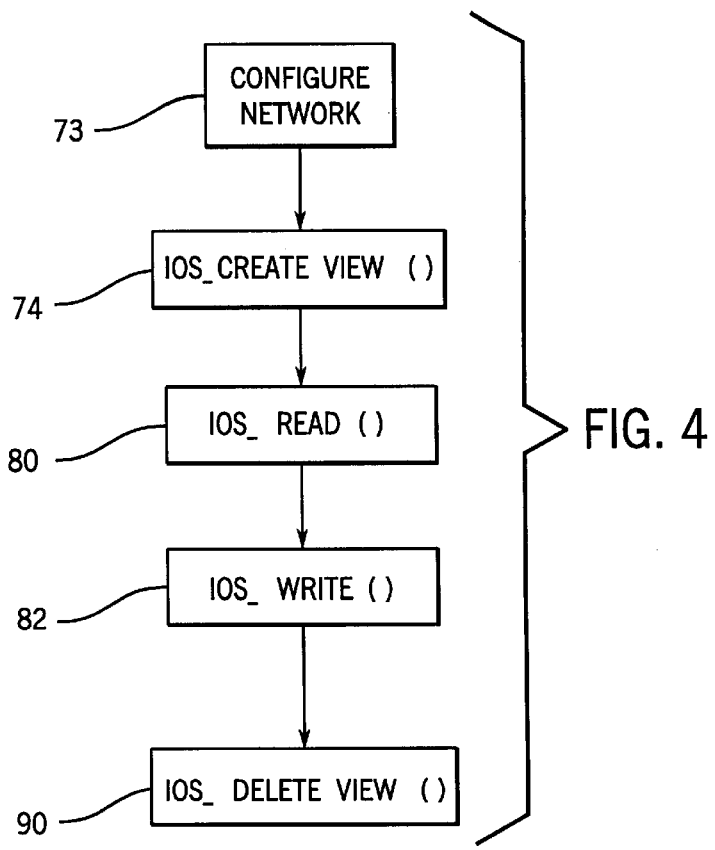

NETWORK INTERFACE FOR INDUSTRIAL CONTROLLER PROVIDING APPLICATION PROGRAMMER INTERFACE

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to industrial control systems and in particular to an interface communicating with data networks normally used in industrial control systems.

Industrial controllers are special purpose computers used for controlling industrial processes or manufacturing equipment. Under the direction of a stored program, the industrial controller examines a series of inputs reflecting the status of the controlled process and changes outputs affecting the control of the process. The inputs and outputs are most simply binary, that is "on" or "off", however analog inputs and outputs taking on a continuous range of values are also used. The binary inputs and outputs may be represented by single bits of data, the analog inputs and outputs may be represented by multiple bit data words.

The various components of an industrial controller are often spatially distributed about a factory or manufacturing facility to be interconnected by one or more communication networks. These communication networks are characterized by being highly reliable and by delivering data with a minimal and well defined delay, as is required for real-time control. A number of different communication networks are commonly used in the industrial controller art including but not limited to: ControlNet; DeviceNet and EtherNet whose specifications are published and whose protocols are used broadly by a number of manufacturers and suppliers. These communication networks differ from one another in physical aspects, for example, the type of media (e.g., co-axial cable, twisted pair light fiber, etc.); the protocols of its operation, (e.g., Baud rate, number of channels, word transmission size, use of connected messaging, etc.) and how the data is formatted and how it is collected into standard messages.

A common component of the industrial controller is an input or output (I/O) module which accepts data for a central control computer from the controlled process or machine, and provides data from the central control computer to the controlled process or machine. I/O modules are typically remote from the central control computer and connected via a communications network as described above.

With the increasing processing power of general purpose "desktop" computers, and in particular those based on microprocessors manufactured by the Intel Corporation, special purpose control computers may no longer be required for low-end control applications. "Soft PLC" (programmable logic controller) programs exist that allow a high-end desktop computer, often with multiple processors, to simulate the operation of a special purpose central control computer. Such soft PLC programs execute programs written in, for example, relay-ladder language to control plug-in I/O modules communicating control signals between the desktop computer and the controlled process.

The large installed base of desktop computers has resulted in powerful and inexpensive computer languages, development systems, desktop operating systems, principally the Windows NT graphical operating system manufactured by Microsoft Corporation. Ideally these languages and tools could be used to directly program a desktop computer to work with standard industrial controller communication networks and I/O modules without the need for a specialized Soft PLC type shell. Unfortunately the task of writing interfaces to standard industrial control networks, which have complex protocols required for the reliable and timely transmission of data, makes direct programming a desktop computer as an industrial controller, cumbersome. A programmer wishing to write a control program using a standard language, such as C, must become an expert with a number of intricate timing and protocol issues associated with the various industrial control networks.

BRIEF SUMMARY OF THE INVENTION

The present invention provides a circuit card that may be attached to a desktop computer to allow a simple programming interface to a wide variety of industrial controller communication networks. A processor on the circuit card executes a run-time program and communicates data between application programs and the communication networks, using the convention of a standard "application programmer's interface" (API) normally provided by the operating system to allow control of standard computer hardware such as disk drives and video monitors. Special extension API functions are provided for reading and writing to a communication network and for collecting data from various devices on the network into a logical unit called a "view". The details of the communication networks and their protocols are made invisible to the programmer.

Specifically then, the present invention provides a multi-network interface connecting a computer with a plurality of industrial control, communication networks employing different protocols to exchange data with remote I/O devices, where the computer executes at least one application program and an operating system and wherein the operating system provides an application programmer's interface allowing the application program to communicate with the computer hardware.

The multi-network interface includes network connections communicating with at least one industrial control network, a configuration database storing information indicating the communication protocol of any connected industrial control network and an API extension integrated with the API of the operating system defining functions for communication on the different networks. A processor communicating with the network connection, the computer, and executing a run-time program communicates data between the application program and the network connection to the API extensions according to the protocols indicated in the configuration database.

Thus it is one object of the invention to provide for a uniform and simple interface between application programs and industrial control networks regardless of the protocols of the latter. By making use of the API, the power of commercially available desktop development environments may be tapped and the need for proprietary development systems or specialized software environments is avoided.

It is another object of the invention to allow for upgrading and changing of network protocols for industrial controller networks without requiring rewriting of industrial controller software. Changes in network protocol require only a change in the network controller and possibly just in the configuration database of the network controller.

The multi-network interface may further include an attribute file associating a unique handle with at least one device on at least one network and the processor may further execute the run-time program to communicate predefined collections of data between the application program and the devices according to a handle provided in an API call.

Thus, it is another object of the invention to allow arbitrary groupings of devices on an industrial control network to be collected for the purpose of exchanging data between the devices and an application program. By placing a definition of this grouping in an attribute file of the multi-network interface, the application programmer's task is much simplified. For example, data on multiple networks may be manipulated as if on a single network.

The API extensions include at one API extension allowing the application program to define a handle and its associated devices.

Thus, it is another object of the invention to allow the application programmer to collect devices as a logical entity within the application program for data communication regardless of the particular networks or devices on the network.

The processor may execute the run-time program to reset watchdog timers on the networks according to protocols indicated in the configuration database.

Thus it is another object of the invention to allow desktop type computers to co-exist with high reliability networks used in industrial control where it is critical to monitor the network health and the health of the controlling processor. By allowing the interface to handle watchdog timers, reliable monitoring of the network and controlling computer may be allowed.

The attribute file may further include an ownership attribute associated with only one handle and the processor may execute the run-time program to allow writing of data to a device on a network only if the handle associated with the API extension indicates ownership of the device. Thus is yet another object of the invention to provide for a highly reliable multi-tasking environment on a desktop type computer by preventing the possibility of two tasks writing conflicting data to an I/O point in the controlled process such as may produce unpredictable behavior in a control environment. By establishing within the multi-network interface, single ownership of each device on a network, such conflicts may be prevented.

The foregoing and other objects and advantages of the invention will appear from the following description. In this description, references are made to the accompanying drawings which form a part hereof, and in which there are shown by way of illustration the preferred embodiment of the invention. Such embodiment does not necessarily represent the full scope of the invention, however, and reference must be made therefore to the claims for interpreting the scope of the invention.

BRIEF DESCRIPTION OF THE SEVERAL VIEWS OF THE DRAWINGS

FIG. 4 is a flowchart representing a set of API calls for communication on a network according to the present invention;

FIG. 5 is a figure depicting a global view of all data on the control system;.

FIG. 6 is a figure similar to that of FIG. 5 showing a device view of the data of the control system; and FIG. 7 is a figure similar to that of FIGS. 5 and 6 showing n I/O set view.

DETAILED DESCRIPTION OF THE INVENTION

Figure 1:
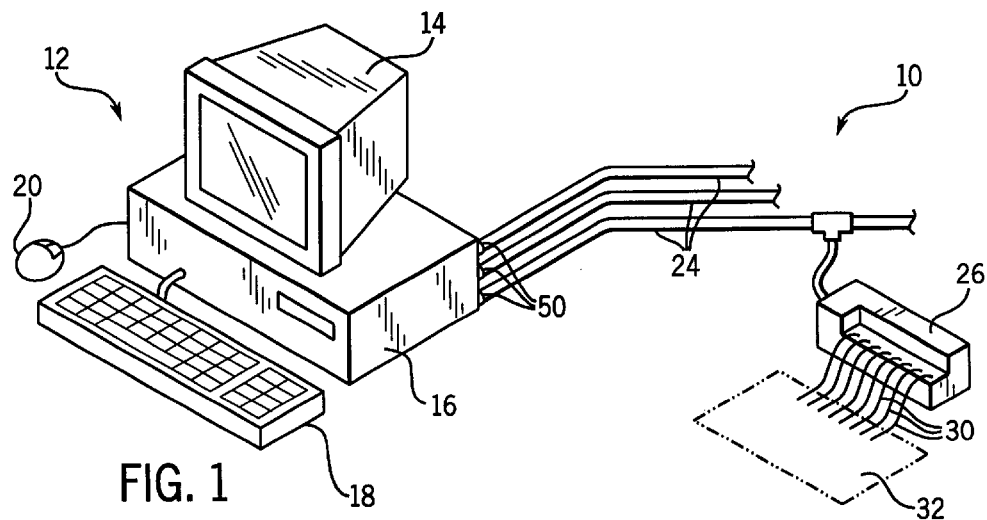
FIG. 1 is a perspective, fragmentary view of an industrial control system employing a desktop computer and one or more communication networks connected to I/O devices which in turn provide signal paths to a controlled process or machine.

Referring now to FIG. 1, an industrial control system may employ a standard desktop computer 12 providing the so-called "Wintel" environment including one or more microprocessors conforming substantially to a defacto standard of the Intel Pentium series of microprocessors available from the Intel Corporation of California and operating a Windows type operating system such as Windows NT available from Microsoft Corporation also of California.

The desktop computer 12 includes a monitor 14, a keyboard 18 and cursor control device 20a (such as a mouse) and a housing 16 such as may hold random access memory, one or more disk drives (not shown), all interconnected by an internal bus as is well understood in the art.

So that the desktop computer 12 may communicate with a process to be controlled, network cables 24 are connected to the desktop computer 12 and lead to I/O devices 26 such as a Flex I/O type device manufactured by Rockwell's Allen-Bradley division of Ohio. The I/O device 26 may include one or more I/O lines 30 communicating control signals between the controlled process 32, the I/O device 26 and ultimately the computer 12.

Figure 2:
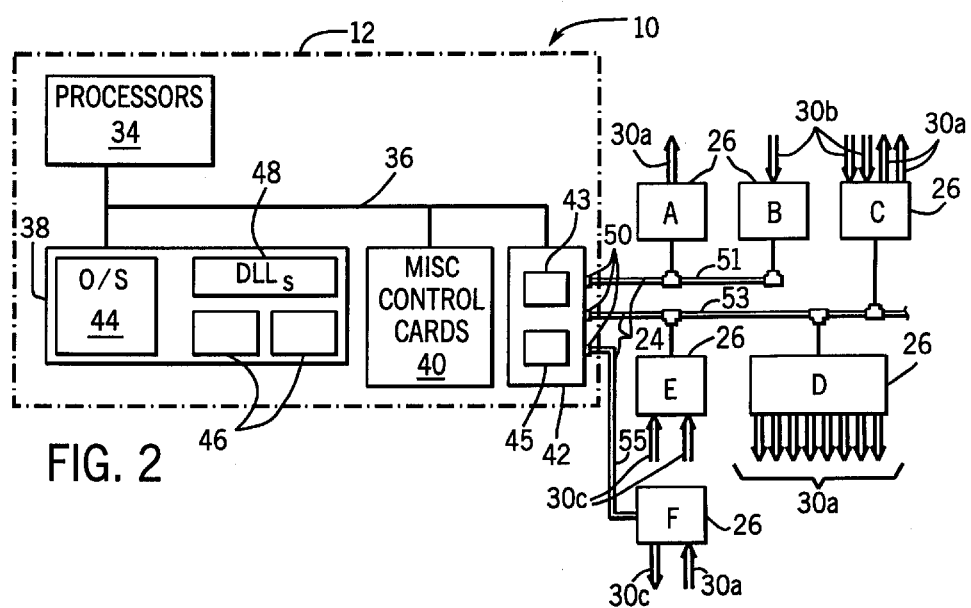
FIG. 2 is a schematic representation of the control system of FIG. 1 showing the communication networks as attached to the multi-network interface of the present invention.

Referring now to FIG. 2, as mentioned, the desktop computer 12 may include one or more processors 34 communicating on an internal bus 36 with memory 38 and various hardware devices 40. The hardware devices 40 may include disk controller cards, video drivers for the monitor 14, a mouse port for the cursor control device and other standard peripheral items well understood in the art. The memory 38 stores an operating system 44 such as the Windows NT operating system and one or more application programs 46 which may be run on a multi-task basis by the operating system 44 according to methods well known in the art. Generally the application programs 46 will have been compiled for the environment of the operating system 44 and thus require communication with the operating system 44 for their execution. At least one application program is a control program for the controlled process 32.

The memory 38 also includes one or more dynamic linked libraries 48 (DLLs) which are loaded into the memory 38 on an as needed basis from a disk drive or the like. Henceforth disk drives and random access memory will be generally referred to collectively as memory 38.

The bus 36 also communicates with a multi-network interface 42 of the present invention which has multiple ports 50 communicating with the network cables 24 for the various networks needed to support the industrial control system 10. The multi-network interface 42 includes its own processor 43 and memory 45 as will be described further below.

As depicted three network connectors are used attached to three different networks. A first network designated network 51 further attaches to two I/O devices 26 labeled A and B. Device A in this example provides sixteen output lines 30a providing one word of data communication to a controlled process 32. Device B provides sixteen input lines 30b providing one word of input data from a controlled process 32. A second independent network 53 supports three I/O devices 26 designated C, D and E. Device C in this example provides thirty-two input lines 30b and thirty-two output lines 30a to communicate a total of four words of data between the computer 12 and the controlled process 32. Device D provides 128 output lines 30a providing eight words of data to the controlled process 128 and device E provides two analog input lines 30c, each decoded into one word of data for two words total. A third network 55 includes I/O device F which provides one analog output line 58 and sixteen discrete inputs for a total of two words of data communication.

A feature of the present invention is that all three networks may be different and in order to obtain the data of the various devices A through F by direct programming in a general purpose language such as C, considerable programming effort may be required.

Figure 3:
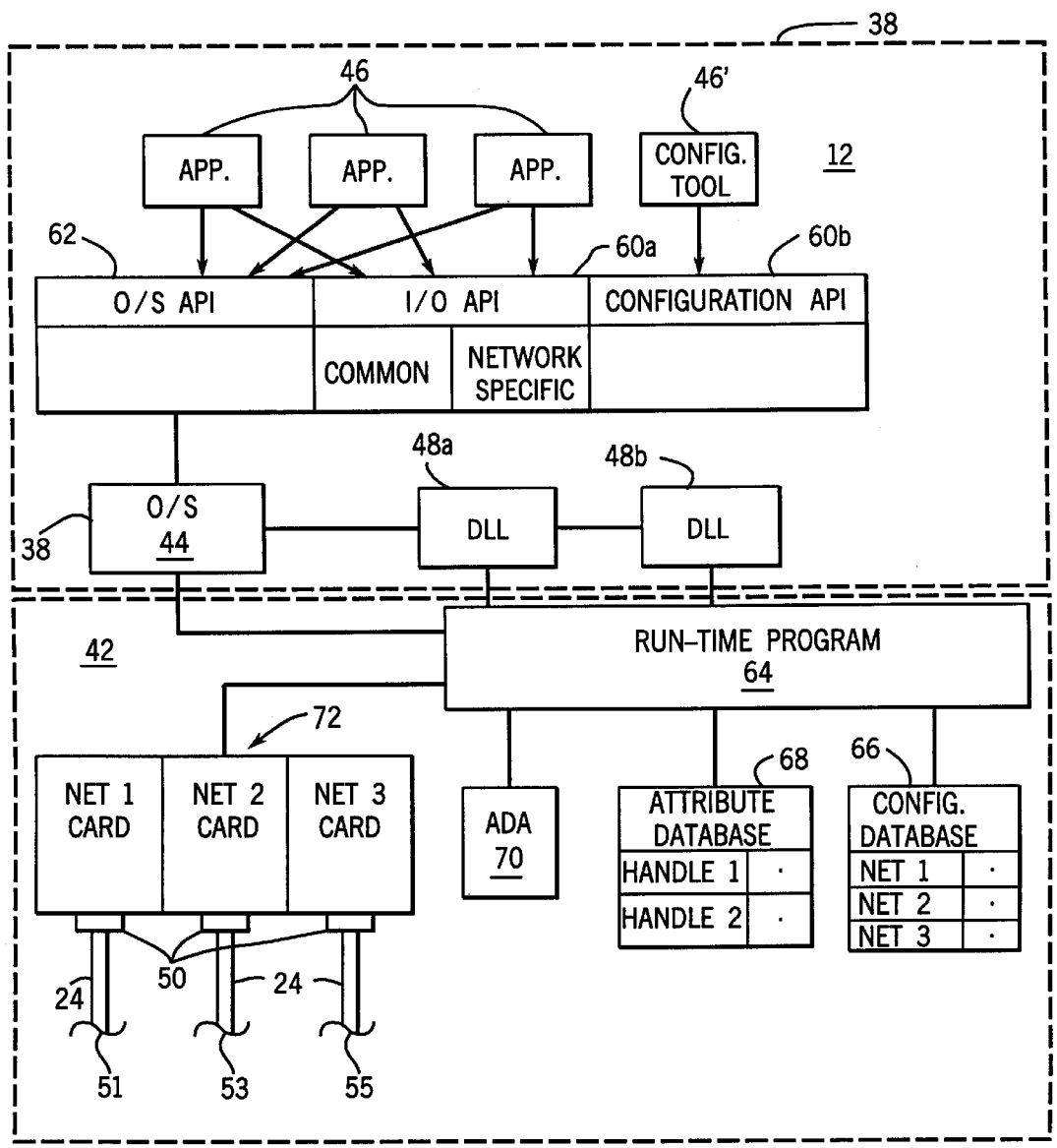
FIG. 3 is a schematic representation of the software employed in the present invention showing the extended API for network communication and configuration.

Referring now to FIG. 3 the multi-network interface 42 of the present invention works in conjunction with application programs 46 contained in the desktop computer 12 by means of a set of extended API calls 60A and 60B operating in conjunction with the operating system API calls 62.

As is understood in the art, various application programs 46 including a control program used in the industrial control system exist in a uniform environment created by the operating system API calls 62 and thus are indifferent to the particular hardware used in the desktop computer 12. The operating system 44 provides a standard set of operating system APIs for functions such as disk reading and writing to controlling sound cards, video monitors or the like. The application program need only call the API functions which accept arguments and return data values to interface with a wide variety of computer peripherals. Compilers for the operating system provide a syntax for making an API call using the language of the compiler according to techniques well known in the art.

The Windows NT operating system and others, support compilers that allow extension of these operating system APIs through the use of dynamically linked libraries 48A and 48B whose location is defined at run-time by the operating system and which are invoked by API calls unique to these functions. Thus extended APIs 60A and 60B may be defined and called from the application program through operation of the operating system 44.

The present invention employs a set of extended APIs 60A and 60B to provide a broader environment for the application programs 46 that include not only the operating system API calls 62 for standard interfaces between computer hardware and the application programs 46 but through extended APIs 60A and 60B to the network cables 24 and hence to all devices 26 necessary for a control system. Specifically, the extended APIs 60A provide for "I/O functions" needed to communicate data on the network cables 24 connected to the multi-network interface 42 and the application programs 46, and the extended APIs 60B provide for "configuration" of the network, which may be done by a special application program other than the control program, to further simplify programming of a control program.

The extended APIs 60A are in turn divided into "common" and "network specific" API calls. To the extent practical, the "common" API calls 60A dominate and are functions that may be invoked on any network used for industrial control. Chief among these "common" API calls are those which create a "view", as will be described, and which is a predetermined collection of devices 26 with which communication will be established, and API calls which read or write to the view. The "network specific" API calls 60A are reserved for functions which may have value to the programmer but may be realized only on certain networks. The preferred embodiment the API function names begin with the character prefix "$IOS_{13}$" so as to distinguish them from operating system API calls 62. Thus for example, four "common" API calls that provide for the creating, deleting, reading and writing operations mentioned would be designated $IOS_{13}$CreateView( ), $IOS_{13}$DeleteView( ), $IOS_{13}$Read( ), $IOS_{13}$Write( ), and $IOS_{13}$CreateGroupView( ). Other functions may also be provided. The parentheses indicate the location of parameters passed between the application program and operating system.

The "configuration" APIs 60B allows for a special application program 46' to be run on the computer 12 to permit configuration of the networks 51, 53, and 55 according to their possibly unique protocols and to create a scan list indicating the number and type of devices attached to each network 51, 53, and 55 as is understood in the art. This configuration is logically independent from the control program and need be done only once for each network configuration and by this mechanism may be made invisible to the application programmer writing the control program. On systems that support it, the scan list may be configured remotely.

The extended APIs 60A and 60B, through the operation of the operating system 44 and compiler, invokes the programs of the DLLs 48A and 48B which serve to receive the passed parameters and communicate them with the multi-network interface 42 over the internal bus 36 of the computer 12.

The creation of such DLL files to provide extended APIs 60A and 60B will vary according to the particular compiler used but is well documented with most commercially available computer languages for use with the Windows NT operating system.

When invoked by the API calls 60A and 60B, the DLLs 48A or 48B provide instructions and the data to the multi-network interface 42 which is executing a run-time program 64. The run-time program 64 manages a configuration database 66, an attribute file 68 and asynchronous data area (ADA) 70, the latter which serves as a buffer area for network communications. The run-time program 64 also manages communication with network cards 72 which serve to manage the lowest level protocols needed for the networks and are generally commercially available for each network. Generally the run-time program 64 includes all software between the applications 46 and the network cards 72 (although the portions of the APIs 60A and 60B provided by the run-time program 64 are shown in block 38 to illustrate the fact that they are logically integrated with the O/S API 62). The operation of the run-time program 64 will now be described.

Referring to FIGS. 3 and 4, as a first step 73, and independently of the creation of the control program 46, a configuration tool application program 46' is invoked which may communicate directly with the multi-network interface 42 and the run-time program 64 to configure the multi-network interface 42. This configuration, common to all networks, sets up the particular network cards 72 and provides an interrupt number on the bus 36 used by the particular network cards 72. This operation may be performed by a network installer separately from the writing of the control program and is indicated by a first process block 73. The configuration tools are specific to the networks 51–55 although it will be understood that higher level configuration commands may be created that are common to all networks.

As the control program is written (as an application 46), data from devices 26 may be needed or data may be needed to be sent to devices 26. In these cases, the application programs 46 make use of an extended API 60A. At a second process block 74, the application program 46 may create a view by making the $IOS_{13}CreateView(\ )$ API call. Normally this requires defining the location of the associated DLL and placing the command "$IOS_{13}CreateView(\ )$" in the source code of the application program 46 together with the necessary parameters as will be described. Upon execution of the compiled application program 46, the DLL 48 associated with this call is run and transmits the necessary data and instructions to the run-time program 64.

For the $IOS_{13}CreateView(\ )$ API call, four variables are returned. (1) a pointer to a location of a "handle", and the size of three buffers for (2) reading data, (3) writing data and (4) holding status information associated with this handle. This information is all returned to the application program 46 upon completion of the call. The application program must in turn provide data in the form of two variables. (1) a pointer to an address structure indicating the particular addresses of the devices 26 on the networks which should be in the view, and (2) a pointer to a previously prepared configuration database for the networks. Other attributes may be set or reviewed by special API functions, Set Attribute ( ) and Get Attribute ( )

Referring to FIG. 3, the configuration database 66 lists each of the networks 51, 53, and 55 and for each network provides information about the network protocol necessary for the run-time program 64 to communicate with the network cards 72. As shown this is one file, however it will be understood that the configurations database 66 may in fact be a number of files to allow it to be upgraded as new networks are added. This will include those protocol functions not handled directly by the network cards 72, for example, the format for the construction of messages on the network, the rules for opening of connections on connected networks and the like. At the conclusion of the execution of the $IOS_{13}CreateView(\ )$ API, an attribute file 68 is produced for the particular handle indexing the handle and the attributes associated with the opening of the view. Those attributes which may also be changed by a later API call, "IOS SetViewAttributes" includes in the preferred embodiment, the following buffer attributes given in Table I:

TABLE I

| Attribute | Description | Default |
|---|---|---|
| Read buffer size | Size of the read buffer | None |
| Write buffer size | Size of the write buffer | None |
| Status buffer size | Size of the status buffer | None |
| Buffering Type | | Overwrite |
| Overwrite | Only the most recent data will be available. | |
| Queued | All data received will be queued. The user can obtain the data in the order in which it was received. | |
| Queue Size | Must be specified if the buffering type is requested | |

All I/O data which arrives over the networks 51, 53 or 55 or from computer 12 may be temporarily stored in the ADA buffer 70. The buffer attributes determine whether new data that arrives overwrites old data or is queued. If the I/O data in the buffer is queued, no existing data will be overwritten. When the queue is full, new data arriving will be lost and an overflow condition will be indicated. If overwrite buffering is selected, when new data arrives, it overwrites the oldest data currently in the buffer.

The following event attributes may also be selected as given in Table II:

TABLE II

| Attribute | Description |
|---|---|
| Event Queue Size | Length of the event queue. |
| Read Notification Events | Predefined events which will be recognized by the multi-network interface after a read activity, such as: Signal on error Signal on arrival Signal on change of state on inputs |
| Write Notification Events | Predefined events which will be recognize by the multi-network interface after a write activity, such as: Signal on completion Signal on error |

The event attributes indicate how events (data whose timing contains important information) are handled. Generally events are real time occurrences to which the control program must be synchronized.

An additional attribute is "privilege" which may be either READ-ONLY or READ/WRITE. The application program 46 that has opened a view that includes a READ/WRITE privilege is considered owner of all the devices 26 associated with that view. Only one owner can exist for a device 26 to prevent conflicting writing of data to that device. Ownership is assigned on a first come, first served basis and only includes I/O outputs, many applications may read devices 26. The ownership is preserved until the view is deleted as will be described. If this privilege attribute is set to READ/WRITE, the run-time program 64 creates a watch-dog timer as will be described in order to detect failure of operation of the computer 12.

Generally, the run-time program 64 allows multiple applications 46 to access the same information from devices without requiring multiple copies of the same data to be acquired over the network. Thus the run-time program 64 not only arbitrates conflicting access but intelligently manages the resources of the network bandwidth. This sharing of data accesses between applications 46 is accomplished by review of the attribute data base to find overlapping data requests and managing the ADA 70 to buffer these requests for multiple applications.

Another attribute is the "output production" attribute which determines when the multi-network interface 42 will write I/O data to a device 26 as summarized in Table III.

TABLE III

| Attribute Value | Description |
|---|---|
| Application Triggered | The multi-network interface sends the output or input data out on the communications network when the client application writes the data to the multi-network interface (immediately). |
| Network Triggered | The multi-network interface stores output or input data in the ADA. Based on the architecture of the communications network, this output data is sent on the communications networks at a pre-determined time (usually, this is a |

TABLE III-continued

| Attribute Value | Description |
| --- | --- |
| | periodic activity). |
| Change of State | The multi-network interface sends the output or input data on the communications network only if the data is different from its previous value. |

This attribute can be assigned one of three values, Application Triggered, Network Triggered and Change Of State. If the attribute is application triggered, the data goes on the communication network 51, 53 or 55 as soon as the application program 46 sends the data to the multi-network interface 42. If the attribute is network triggered, then the data is sent across the communication network 51, 53 or 55 at a predetermined time based on network protocol. Prior to that time, it is stored in the ADA 70. The change of state attribute sends data only if it has changed thus preserving network bandwidth.

An additional attribute defines the current status of the multi-network interface 42 and the devices being scanned and thus allows the application programmer some window onto the operation of the network 51, 53, and 55. The following attributes are supported.

TABLE IV

| Attribute Value | Description |
| --- | --- |
| Reset | Connection not established. (Was established previously but has been closed or shut-down). |
| Idle | Communications active. Inputs being read from. |
| Run | Communications active. Inputs read from and outputs written to. |
| Test | Discrete outputs are inactive, inputs are being read, block transfers are enable. |

An extremely useful attribute defines the scope of the "view" which may be "global", including all devices 26 on the network 51, 53, and 55; "network", including all the devices 26 on a single network 51, 53, or 55, "group" being a combination of other views, "device", being all I/O points on a particular device 26 or "index" being a portion of the I/O lines 30 in a particular device 26 are summarized in the following Table V. Not all networks 51, 53, and 55 or devices 26 support all these view scopes.

TABLE V

| Type of View | I/O Data Encapsulated by the View |
| --- | --- |
| Global | all devices on all networks |
| Network | all devices on a specific network |
| Group | all I/O data of other member views |
| Device | all I/O of a particular device |
| Indexed | a portion of the I/O of a device |
| Image Table | I/O data of an image table in a device |

Specialized views for particular networks 51, 53, and 55 are also created to allow I/O image tables as are well known in the art, to be transferred as a logical unit.

An additional API call "IOS CreateGroup", not shown, may be used to combine handles of other previously created views to create a new view. In this case, the attribute file 68 for the handle of the new view includes the handles of the views of which it is composed so that all the same attribute information may be obtained. This API call passes an array of view handles to the multi-network interface 42 in order to create the group.

Similar APIs are provided to add and delete group members by passing the handles needed for the change.

Referring again to FIGS. 3 and 4, the work in creating the view is rewarded by an extremely simple interface for reading data from the collected devices. An API call "$IOS_{13}$Read( )" allows a simple reading of the data of the previously defined view. This API call passes the handle number to the multi-network interface 42 and returns pointers to the data location in the ADA 70 where the data will be stored and to status information, if desired, as indicated by block 80. The data is read according to the attributes of Table III.

Referring now to FIG. 5 for the network of FIG. 2, the data returned by this call (in this example one having global scope) would be arranged in an array 81 with data from devices 26 with the lowest address numbers on the networks 51, 53, and 55 and lowest port 50 having their data placed first. Thus a single word of data from device A makes up the first location in the array 81 followed by a single word of data from device B, followed by the four words of data from device C, the eight words of data from device D, a single word of data from device E and a single word of data from device F. With the pointer returned by the API call, the application program may randomly access this data as desired.

More efficiently, however, the programmer may wish to access only particular data and the scope of the view may be restricted accordingly. This restricted scope not only may improve network efficiency but allows the data being accessed to relate logically to the reason for the access, for example, the data may be two relevant temperature measurement on devices A and B. The other data being of no immediate relevance to the applications is ignored. Referring to FIG. 6 the data of a group view of two device views (of devices A and B) is shown. Referring to FIG. 7, much finer resolution of data is possible in this case by using a group view composed of I/O set views of the first three bits of the data of device A and the first three bits of the data of device E.

Referring again to FIG. 4, as indicated by process block 82, if the view provides for Read/Write privileges, a writing of data may also be performed. In this case, the handle of the view is passed to the run-time program 64 via API call "$IOS_{13}$Write( )" which returns pointers to the location where the data should be written. The application program 46 may then write that data to the common memory where it will be read by the run-time program 64 (according to the attributes of Table III). Upon the writing at process block 82, a watchdog timer is reset so as to monitor the status of the application program and to make an alert to the user if an apparent failure has occurred.

At the conclusion of communication with the network 51, 53, or 55, the application program 46 executes an API call $IOS_{13}$DeleteView( ) as indicated by process block 90 which passes handles of the views to be deleted to the run-time program 64 which eliminates the entry's further view from the attribute file 68 and releases any buffer memory reserved to that view.

The attributes of the view may be separately changed by a "$IOS_{13}$SetViewAttributes" call, as mentioned above, and the configuration database 66 may be changed by a "$IOS_{13}$RefreshView" call if the network is changed.

The application program 46 may also detect real time events through one of two mechanisms, the API call "$IOS_{13}$Get Event( )" which may block the thread of the application program 46 until the event occurs, according to well known event handling API techniques. Events may include errors in reading or writing up to the network, hardware failures or watchdog time outs. More common events are the arrival of data from the network or a change of value for specific data item.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. A multi-network interface connecting a computer in parallel with plurality of industrial control networks employing different communication protocols to communicate with remote I/O devices, the computer executing at least one application program and an operating system, the operating system providing an API allowing the application program to communicate with the computer, the multi-network interface comprising:

(a) network connections communicating with at least two industrial control networks having at least two different communication protocols of operation;

(b) an upgradable configuration database storing information indicating the communication protocol of each industrial control network attached to the network connections;

(c) API extensions integrated with the API of the operating system defining common functions for communication on the different networks;

(d) a processor communicating with the network connections and the computer and executing a run-time program to communicate data between the application programs and the network connections through the API extensions according to the protocols indicated in the configuration database; and (e) an asynchronous data area (ADA) managed by the run-time program, wherein the ADA is capable of storing data that is communicated over the industrial control networks;

whereby a simple and uniform interface is provided between application programs and industrial control networks.

2. The multi-network interface of claim 1 including further an attribute file associating a unique handle with at least one portion of a device on at least one network and wherein the processor further executes the run-time program to communicate collections of data between the application programs and at least the portion of the device according to the handle associated with the portion and network in the attribute file, and wherein at least one of the API extensions defining functions for communication on the different networks specify the handle.

3. The multi-network interface of claim 2 wherein the API extensions include at least one create-view API extension allowing the application program to define a handle and its associated devices.

4. The multi-network interface of claim 3 wherein the create view API extension allows all devices on one network to be associated with a handle.

5. The multi-network interface of claim 3 wherein the create view API extension allows all devices on all networks to be associated with a handle.

6. The multi-network interface of claim 3 wherein the devices include individual I/O points and wherein the create view API extension allows only particular I/O points on a device to be associated with a handle.

7. The multi-network interface of claim 1 wherein the processor executes the run-time program to reset watchdog timers on the networks according to protocols indicated in the configuration database.

8. The multi-network interface of claim 1 wherein the attribute file further includes an ownership attribute associated with only one handle, and wherein the processor executes the run-time program to allow writing of data to a device on a network only if the handle associated with the API extension indicates ownership of the device.

9. The multi-network interface of claim 1, wherein the at least two industrial control networks are selected from the group consisting of a ControlNet network, a DeviceNet network, and an Ethernet network.

10. The multi-network interface of claim 1, wherein the at least two network protocols of operation differ from one another according to at least one of Baud rate, channel number, word transmission size, and connected messaging use.

11. A multi-network interface connecting a computer in parallel with plurality of industrial control networks employing different communication protocols to communicate with remote I/O devices, the computer executing at least one application program and an operating system, the multi-network interface comprising:

(a) network connections communicating with at least two industrial control networks having at least two different communication protocols of operation;

(b) an upgradeable configuration database storing information indicating the communication protocol of each industrial control network attached to the network connections, (c) an attribute file associating a unique handle with at least one device on at least one of the networks; and (d) a processor communicating with the network connections and the computer and executing a run-time program to communicate collections of data between the application programs and the devices according to the handle as associated with the at least one device and network in the attribute file according to the protocols associated with the networks in the configuration database; and (e) an asynchronous data area (ADA) managed by the run-time program, wherein the ADA is capable of storing data that is communicated over the industrial control networks;

wherein the multi-network interface card is implemented using a card that is capable of being coupled to and decoupled from a bus of the computer, whereby a simple and uniform interface is provided between application programs and multiple devices on industrial control networks.

12. The multi-network interface of claim 11 wherein the API extensions include at least one create-view API extension allowing the application program to define a handle and its associated devices.

13. The multi-network interface of claim 12 wherein the create view API extension allows all devices on all networks to be associated with a handle.

14. The multi-network interface of claim 12 wherein the devices include individual I/O points and wherein the create view API extension allows only particular I/O points on a device to be associated with a handle.

15. The multi-network interface of claim 12 wherein the create view API extension allows all devices on one network to be associated with a handle.

16. The multi-network interface of claim 11 wherein processor executes the run-time program to reset watchdog timers on the networks according to protocols indicated in the configuration database.

17. The multi-network interface of claim 11 wherein the attribute file further includes an ownership attribute associated with only one handle, and wherein the processor executes the run-time program to allow writing of data to a device on a network only if the handle associated with the API extension indicates ownership of the device.

18. The multi-network interface of claim 11, wherein the at least two industrial control networks are selected from the group consisting of a ControlNet network, a DeviceNet network, and an Ethernet network.

19. The multi-network interface of claim 11, wherein the at least two network protocols of operation differ from one another according to at least one of Baud rate, channel number, word transmission size, and connected messaging use.

* * * * *